United States Patent [19]
Behrens

[11] Patent Number: 5,959,938
[45] Date of Patent: Sep. 28, 1999

[54] TUNED BUBBLE ATTENUATOR FOR TOWED SEISMIC SOURCE

[75] Inventor: William Henry Behrens, Sugar Land, Tex.

[73] Assignee: Baker Hughes Incorporated, Houston, Tex.

[21] Appl. No.: 08/916,477

[22] Filed: Aug. 22, 1997

[51] Int. Cl.[6] ....................................................... G01V 1/38
[52] U.S. Cl. ................................ 367/15; 367/24; 181/120
[58] Field of Search .......................... 367/15, 24; 181/120

[56] References Cited

U.S. PATENT DOCUMENTS

| | | | |
|---|---|---|---|
| 2,954,090 | 9/1960 | Burg et al. | 367/24 |
| 4,618,024 | 10/1986 | Domenico | 181/120 |
| 4,625,302 | 11/1986 | Clark | 367/24 |
| 4,632,213 | 12/1986 | Domenico | 181/106 |

Primary Examiner—Ian J. Lobo

[57] ABSTRACT

An apparatus and method for modifying the seismic source signal from air guns towed behind a marine seismic vessel. At least one conduit is towed behind the vessel to release bubbles into the water. The bubbles are formed with compressed air released from apertures in the conduit. The size and distribution of the bubbles is controlled by varying the aperture size, the compressed air pressure, the aperture position and orientation on the conduit, and the vessel speed. The bubbles attenuate side directional frequencies to reduce the outwardly directed seismic source signal and to improve the signal to noise ratio at the receivers. By controlling the bubble size and distribution, attenuation of selected frequencies can be controlled.

12 Claims, 3 Drawing Sheets

Fig. 1

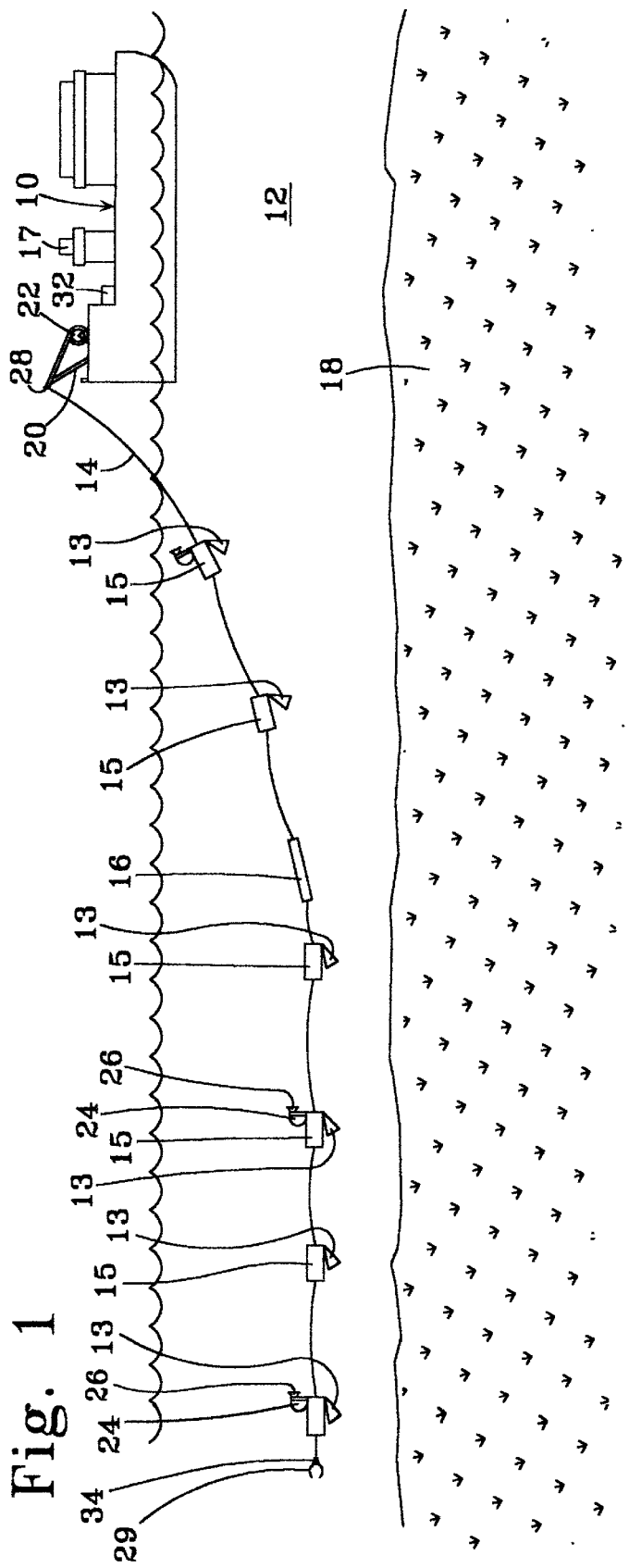
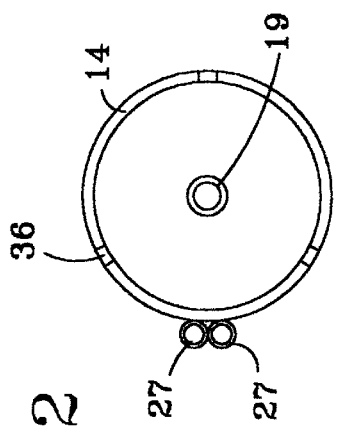

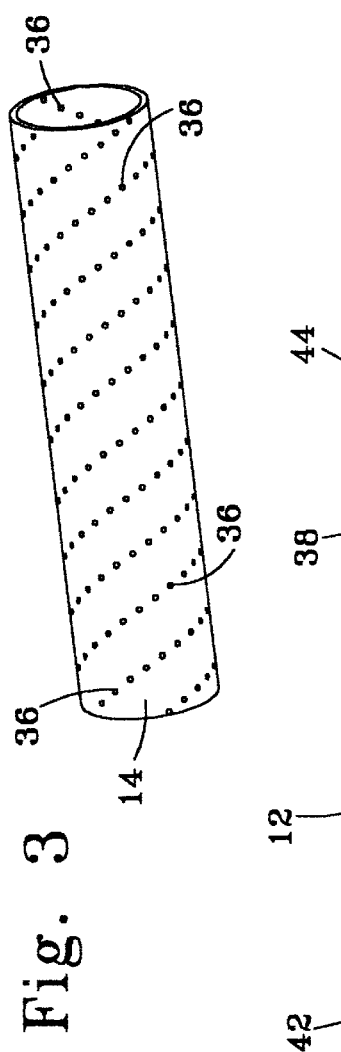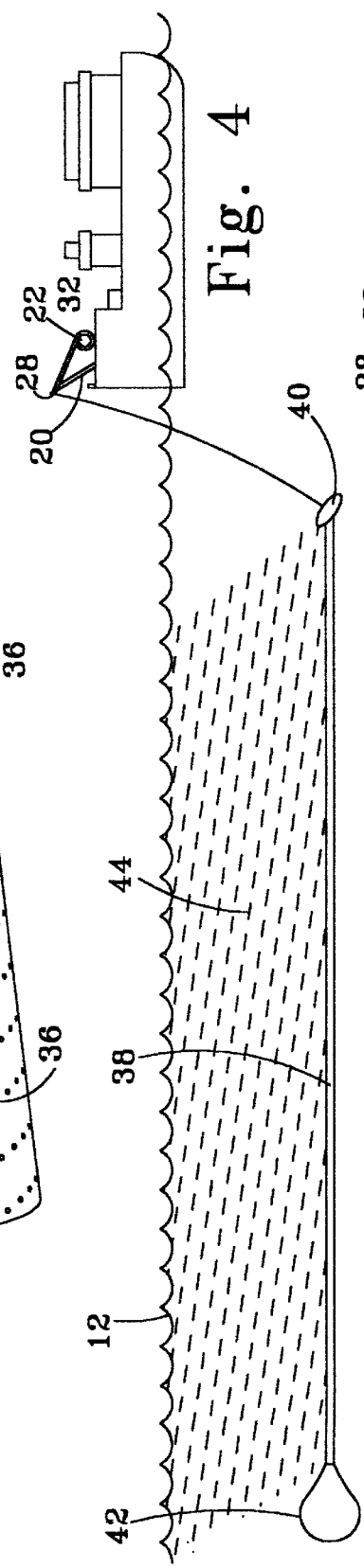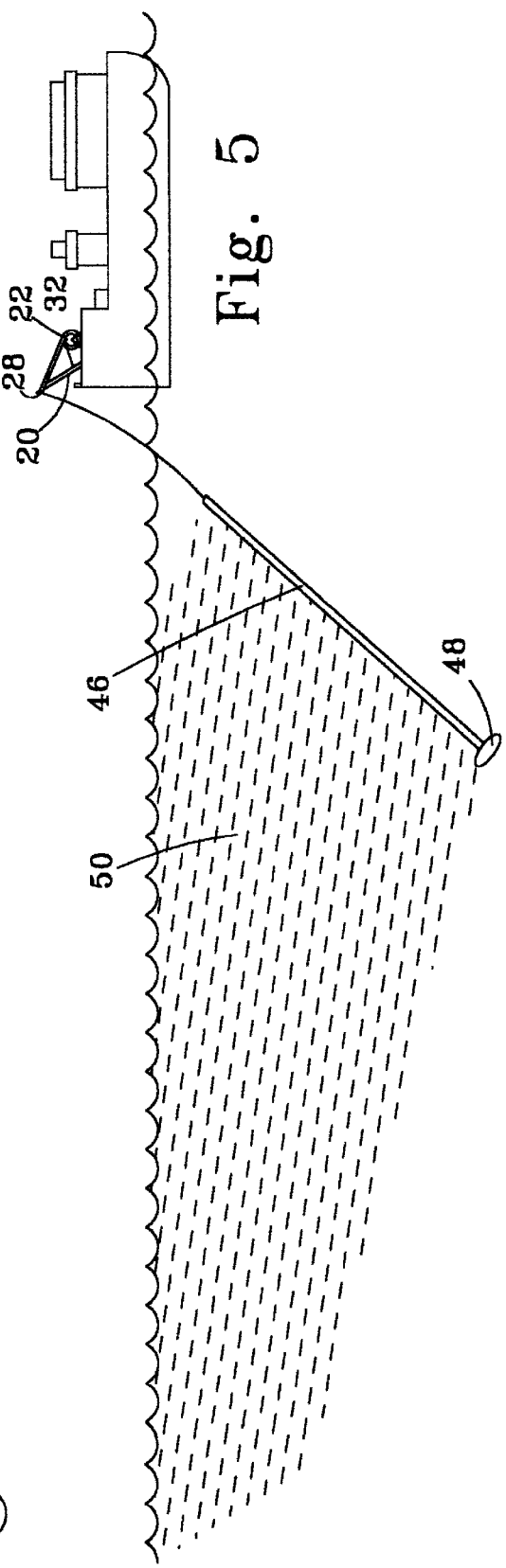

5,959,938

TUNED BUBBLE ATTENUATOR FOR TOWED SEISMIC SOURCE

BACKGROUND OF THE INVENTION

The present invention relates to the field of marine seismic data acquisition. More particularly, the present invention relates to a tuned bubble attenuator, for use with a seismic source towed behind a vessel, for modifying the side directional frequencies produced by the seismic source.

Seismic exploration in water is performed by selectively introducing acoustic pulse energy into the water. The water can be located in marshes, tidal areas, lakes, rivers, bays, or open seas. Acoustic pulse energy is typically propagated by air guns towed by a vessel and is reflected from different reflective horizons. The reflective horizons can comprise the interface between the water and soil or the interfaces between subfloor geologic formations. The reflections are sensed by towed receivers such as hydrophones, and the resulting hydrophone signals are processed to permit evaluation of the geologic formations.

The depth of investigation and signal quality generated by the acoustic source depends on various factors. The ratio of signal strength to noise level at the hydrophones is a significant factor in seismic data acquisition. To improve this ratio, U.S. Pat. No. 4,625,302 to Clark (1986) described an apparatus for generating an "acoustic lens" formed by air bubbles in a water zone. The acoustic lens refracted acoustic waves, reflected from the sea floor or from subfloor geologic structures, to reduce undesirable noise sensed by the hydrophones.

U.S. Pat. No. 4,618,024 to Domenico (1986) similarly described a gas releasing device for forming a paraboloid in the water for the purpose of reflecting acoustic wave energy downwardly into the water. The paraboloid attenuated upwardly and horizontally traveling acoustic wave energy produced by the seismic source as the source was moved through the water. Domenico emphasized that the paraboloid structure is important to the objective of downwardly reflecting acoustic source energy, and that the paraboloid bubble structure effectively reduced the size of the acoustic energy source.

The strength and quality of the acoustic source pulses is important to the depth of investigation and reflected signal quality. Because the acoustic pulse energy is transmitted in all directions within the water, the strength of the acoustic pulse energy propagated downwardly into the geologic formations represents only a portion of the acoustic source energy. Much of the acoustic pulse energy is dissipated laterally and upwardly in the water. Although bubble zones are known to modify acoustic pulse propagation in a static, nonmoving environment, the beneficial effect of bubble zones towed by a moving seismic vessel does not effectively permit noise attenuation over a wide frequency range.

Accordingly, a need exists for an improved apparatus and method for reducing undesirable noise and for enhancing the effectiveness of acoustic pulses as a seismic vessel tows seismic energy sources through the water.

SUMMARY OF THE INVENTION

The present invention provides an apparatus and method for modifying signals generated by a seismic source towed in water behind a vessel, and particularly for attenuating horizontally transmitted acoustic energy. The apparatus comprises a compressed air source, a conduit attached to the compressed air source and to the vessel for trailing behind the vessel and for conveying compressed air, and a plurality of apertures in said conduit for distributing compressed air into the water in the form of bubbles. In various embodiments of the invention, the size, position and orientation of the apertures can be selected to modify the bubble size, distribution, and seismic signal attenuating capabilities.

The method of the invention is practiced by deploying a hollow conduit to trail behind the moving vessel in a selected orientation relative to the seismic source, by supplying compressed air to said conduit to pressurize said conduit interior, and to release the compressed air from said conduit interior through a plurality of apertures through said conduit wall to form bubbles in the water. The bubbles are released in the water to selectively attenuate the horizontal acoustic energy. The vessel speed and compressed air pressure can be selected to modify bubble formation.

BRIEF DESCRIPTION OF THE DRAWINGS

FIG. 1 illustrates an elevation view of a conduit towed through the water behind a marine seismic vessel.

FIG. 2 illustrates an end crossectional view of a compressed air carrying conduit.

FIG. 3 illustrates a conduit section showing a helical nozzle configuration.

FIG. 4 illustrates a horizontal bubble curtain.

FIG. 5 illustrates an inclined bubble curtain.

DESCRIPTION OF THE PREFERRED EMBODIMENTS

Figure 6:
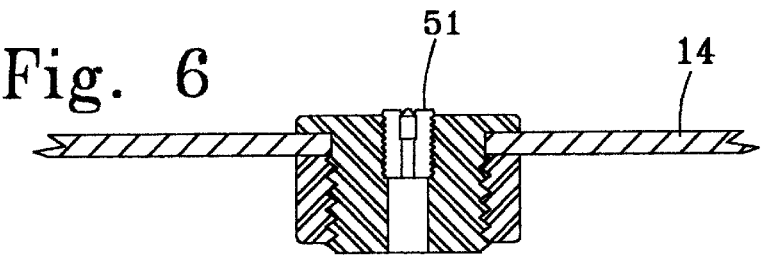
FIG. 6 illustrates a vertical nozzle.

The invention discloses an apparatus and method for modifying the acoustic pulse signals generated by air guns towed behind a marine seismic vessel. In particular, the invention relates to a tuned air curtain apparatus and method for reducing shot generated noise. Referring to FIG. 1, vessel 10 is located in water 12. Weights 13 are attached to line 14, having line connections 15, which is towed behind vessel 10 and is attached to a seismic source such as air gun 16. As used herein, the term "seismic source" refers to one or more sources for generating wave energy. In the embodiment illustrated, air gun 16 generates acoustic waves in response to a firing signal from control equipment 17 on vessel 10. The acoustic waves propagate through water 12, past the interface between water 12 and sea floor 18, and into the subsurface geologic formations underlying water 12. The acoustic waves partially reflect upwardly from the interface between reflective zones, and the reflected signals are detected with one or more hydrophones (not shown) towed behind vessel 10.

As shown in FIG. 2, line 14 forms a hollow tube or hose for transporting compressed air. Line 14 can incorporate a tension cable 19 to provide strength. In one embodiment, line 14 can comprise a nylon reinforced rubber rated to 250 psi. Such material is tough and is resistant to abrasion but also tends to expand as the air pressure increases, thereby affecting the system buoyancy. Additionally, nylon fibers swell from water absorption and further elongate due to tensile loading in the areas between line connections 15. The resulting slack line increases drag and reduces tow stability for the system. To reduce towing complications and the possibility of line 14 breakage, tension member 19 can be run through the center of line 14 as shown in FIG. 2. Alternatively, dual tension members can be incorporated on opposite sides of line 14. Tension member 19 is attached to line 14 at different points, and the buoyancy of line 14 between the connection points shapes line 14 in a nonlinear, catenary shape.

As shown in FIG. 1, weights 13 can be attached to line 14 to achieve the desired operating depth. When the system is initially deployed, compressed air is not injected into line 14, and line 14 and attached weights 13 sink in water 12. In shallow water, the weights may drag the sea bottom until the desired tow speed is attained.

Line 14 is paid out and taken in with cable handling equipment such as boom 20 and cable handling drum 22. Temperature or depth sensors 24 and pressure sensors 26 are connected to line 14, and generate signals correlating to water depth and pressure and other parameters such as temperature. Pressure sensors 26 can monitor the compressed air pressure within line 14 or can be mounted external to line 14 to measure water depth or water pressure. Cables 27 shown in FIG. 2 can transmit signals between depth sensors 24 and pressure sensors 26 and control equipment 17.

Tow point 28 provides the point of attachment between line 14, boom 20, and vessel 10. Although one line 14 is illustrated, multiple lines 14 and air guns 16 can be positioned in one or more arrays behind vessel 10. Tail buoy or paravane 29 and other floats (not shown) can be incorporated into such arrays to maintain the system position and elevation in water 12. Additionally, the weight and towing characteristics can be used to achieve desired depth and position relative to the signal sources.

Line 14 is attached to tow point 28 and trails behind vessel 10 in water 12. Line 14 can comprise a hollow line or hose and is connected to air compressor 32 on vessel 10. The trailing end of line 14 is attached to plug 34 to provide a back pressure against compressed air within line 14. Line 14 can be formed with a single piece or with multiple connecting sections. Line 14 can comprise a triangular, rectangular, multi-chambered, or tubular hose or any other shape or configuration suitable for communicating compressed air as described below. Line 14 can be oriented about a longitudinal axis extending parallel to the length of line 14.

Referring to FIG. 3, a portion of line 14 is illustrated. A plurality of apertures 36, also referred to herein as "nozzles", are positioned in the outer wall of line 14 along the length of line 14. Apertures 36 permit the release of compressed air from the interior of line 14 into water 12. The released bubbles rise to the surface of water 12 and create a bubble zone having less density than water. Such bubble zone has a greater impedance to acoustic wave transmission than water, and therefore provides a resistance to acoustic energy transmission. Apertures 36 can comprise nozzles which regulate the flow rate of compressed air from the interior of line 14 into water 12. Apertures 36 can comprise fixed size ports of equal or varying sizes or can comprise adjustable nozzles which can be modified to increase or decrease the compressed air flow rate. This adjustable feature of apertures 36 can be useful for long lengths of line 14 where the pressure drop from compressor 32 to plug 34 exceeds a desirable level. Alternatively, such pressure drop can be calculated or determined in advance, and the fixed size of apertures 36 can be increased from compressor 32 toward plug 34 to equalize the compressed air flow rate exiting different apertures 36.

In one embodiment of the invention as shown in FIG. 3, apertures 36 are illustrated in a helical pattern about line 14 to distribute the bubbles in a manner which increases the number of bubbles formed in a given distance along the longitudinal axis of line 14. Such configuration permits the maximum number of apertures 36 to be placed within a particular linear length of line 14 while preventing coalescence of adjacently formed bubbles. This configuration is also useful because twisting and other movement of line 14 about the longitudinal axis does not significantly modify the distributed bubble pattern. Although a helical pattern is illustrated, other configurations of apertures 36 can be constructed to provide the desired results. In different tests, between 50 and 450 nozzles have been successfully incorporated into each array.

Apertures 36 are preferably oriented at a selected angle to the longitudinal axis through line 14 to facilitate bubble formation on the outside surface of apertures 36. In different embodiments of the invention, the angle can be ninety degrees or a lesser angle relative to the longitudinal axis. As compressed air exits each aperture 36, a bubble forms on the outside of line 14 in the relatively laminar flow zone between the outer surface of line 14 and water 12. When each bubble reaches a certain size each bubble will detach from the respective aperture 36 depending on vessel velocity, the pressure and temperature of water 12, the compressed air pressure within the interior of line 14, and other variables. Each bubble will rise upwardly as a single volume of air, may combine with other bubbles, or may deteriorate into multiple bubbles each having a lesser volume.

The stand-off distance from the end of each aperture 36 to the outside of line 14 will affect bubble formation. Near the outside of line 14, a laminar zone forms which is minimally affected by the movement of water 12 relative to towed line 14. In this zone, large air bubbles can form without significant interference. As the stand-off distance from line 14 increases, the velocity of line 14 through water 12 creates turbulence destructive to large bubble formation. In addition to the stand-off distance from line 14, the orientation of apertures 36 downstream of the directional movement facilitates large bubble formation.

In a preferred embodiment of the invention, apertures 36 are oriented or spaced along line 14 so that bubbles do not generally commingle before such bubbles reach the surface of water 12. This feature of the invention is preferred where vessel 10 tows line 14 through water 12 because such feature permits control over bubble size. Because bubble size has been determined to be significant to the selective attenuation of acoustic wave energy, the present invention controls bubble size to selectively attenuate selected frequencies emanating from air gun 16. Larger, controlled bubbles have the capability of attenuating lower frequencies in a moving environment than was previously believed possible, and the present invention teaches the formation of larger bubbles as a means of attenuating lower frequencies within the source signals. Smaller bubbles have the capability of attenuating higher frequencies within the source signals.

Although relatively large bubbles are preferred, a combination of large, small and intermediate bubble size distributions can be made to selectively provide impedance in a water zone to acoustic energy transmission, or to attenuate one or more frequencies within the source signals. As used herein, the term "frequency" refers to a discrete frequency or to a frequency band or range.

FIG. 4 illustrates one embodiment of the invention wherein horizontal bubble tube 38 is attached between depressor 40 and tail buoy 42. Bubble curtain 44 is illustrated as a substantially rectangular zone wherein the air bubbles are rising to the surface of water 12. FIG. 5 illustrates another embodiment of the invention wherein bubble tube 46 is towed at an inclined angle relative to the surface of water 12. Bubble tube 46, defined herein as an "inclined conduit, can be shorter than the horizontal bubble tube illustrated in FIG. 4. The position of bubble tube 46 is maintained under tow with depressor 48, and bubble tube 46 generates bubble curtain 50 as illustrated.

The bubble screen density can be determined from the following analysis. Assuming a compressor capacity of 300 cfm, an array length of sixty feet of two inch pipe, a standard inlet pressure (P) of 101,000 Pa and a temperature (T) of 293 degrees K, the air density:

$$\rho = P/RT = 101,000/286/293 = 1.205 \text{ kg/m}^3.$$

Therefore, the mass flow rate mdot is calculated as:

$$\text{mdot} = 300 \text{ cfm} \times (0.000472 \text{ m}^3/\text{s/cfm}) \times \rho = 0.17065 \text{ kg/s}$$

For the parameters stated above, the mass flow rate per meter of curtain mdotl:

$$\text{mdotl} = (0.17065 \text{ kg/s})/(60 \text{ feet} \times 0.3048 \text{ meters/foot}) = 0.00922 \text{ kg/s/m}.$$

In 3.281 seconds (the time for bubbles to rise one meter at a vessel speed of one foot per second), a desirable mass of air injected into the water per meter of bubble curtain is:

$$M = \text{mdotl} \times 3.281 = 0.0306 \text{ kg}.$$

Figure 7:
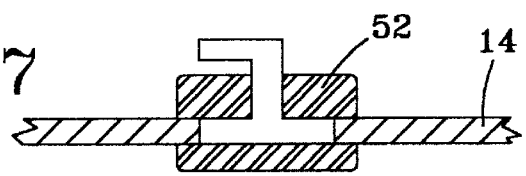
FIG. 7 illustrates an inclined nozzle.
Figure 8:
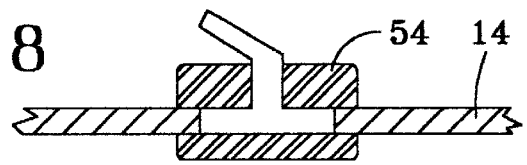
FIG. 8 illustrates a banjo nozzle.

The configuration and orientation of the apertures forming nozzles 36 is relevant to the performance of the invention. It has been discovered that the generation of excessive numbers of small bubbles in the water column tends to limit maximum bubble size. Vertical nozzle 51, which ejects an air plume in an orientation perpendicular to the flow direction as shown in FIG. 6, tend to create undesirable small bubbles. Nozzles such as angle nozzle 52 shown in FIG. 7, or banjo nozzle 54 shown in FIG. 8 which ejects an air plume oriented parallel to the flowstream in an upstream or downstream direction, create larger bubbles than vertical nozzles. Angle nozzles develop a large average size bubble stream with a minimal number of smaller bubbles. For upstream oriented nozzles, bubble size decreases with increasing vessel velocity. Downstream oriented nozzles are not affected by this feature, and a preferred embodiment of the invention utilizes welded banjo nozzles oriented downstream. Higher inflow compressed air pressures tend to produce higher levels of small bubbles and fewer large bubbles.

Figure 9:
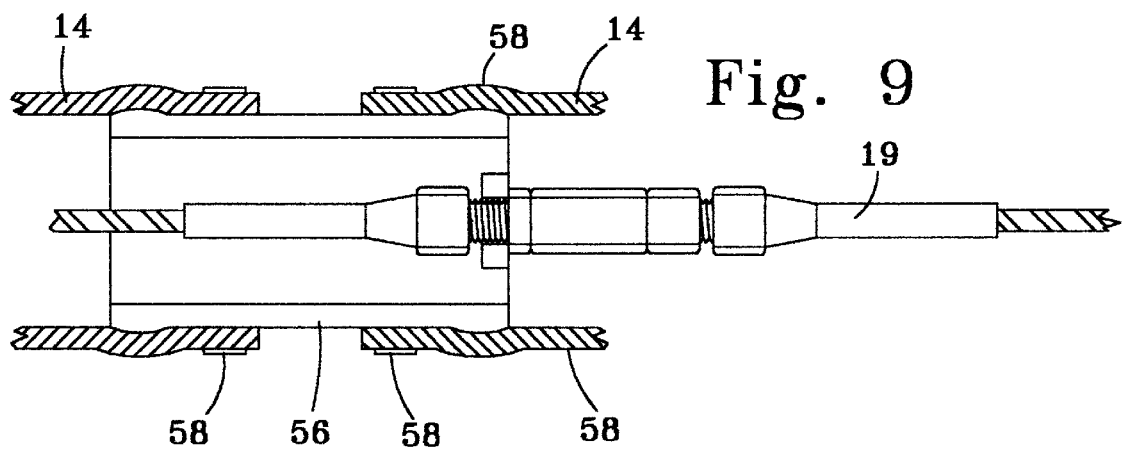
FIG. 9 illustrates a sectional view of a conduit and internal tension member.

A crossectional view of line 14 is illustrated in FIG. 9 wherein tension member 19 is attached to connector 56. Line 14 is attached to connector 56 with clamps 58, and tension member 19 provides structural strength to the conduit forming line 14.

The method of the invention is practiced by deploying line to trail behind the vessel 10 in a selected orientation relative to the seismic source. In different embodiments of the invention, line 14 can be positioned proximate to and above air guns 16, or can be positioned proximate to and at substantially the same elevation as air guns 16. The positioning of conduit such as line 14 will determine boundaries for the region identified as the bubble zone in water 12, and such positioning above or to the side of air guns 16 will affect noise attenuation capability of the system. Line 14 can be oriented in a horizontal or inclined orientation, or in a particular array or shape to achieve the desired bubble zone configuration.

After line 14 is deployed into the water, compressed air is supplied into line 14, and the compressed air is released through apertures 36 in the wall of line 14 to form the source signal modifying bubbles. The aperture size and orientation can be selected based on the speed of vessel 10, and the pressure of the compressed air can be controlled to modify the bubble size and concentration within a particular bubble zone. The pressure of water 12 and of the compressed air and the vessel 10 speed can be monitored to provide for interactive control of bubble formation. If apertures 36 comprise adjustable nozzles, such nozzles can be interactively controlled to adjust for other variables in the system, or to vary the modifications acting on the source signal.

The towing speed of seismic vessel 10 affects bubble size and orientation of the array. In a static environment, relatively large bubbles can be formed with a nozzle size approximately 3/32 to 7/32 inch in diameter. When vessel 10 tows line 14 through water, the relatively large bubbles disintegrate into multiple small bubbles. At a vessel tow speed of five knots, the tow vessel moves 8.5 feet forward in the time a bubble vertically rises one foot in the water. In a preferred embodiment of the invention as shown in FIG. 5, the bubble screen can be generated from an inclined array, rather than a horizontal array, to provide a correct density of bubbles over the entire vertical window. The inclined array design further reduces the catenary effect of line buoyancy between depth stabilizers. The inclined line concept reduces handling requirements, and the trail angle of in the amount of sixty degrees significantly reduces the required length of line 14.

A hydrodynamic depressor vane as previously described for paravane 29 can be installed at the trailing end of the inclined bubble array to achieve desired depth and to provide towing stability of the loose end of the array. Such depressor can be outfitted with a depth sensor to ensure that required depth is achieved, and a depressor fin (not shown) can be equipped with a mechanism for adjusting weight and depth by adding weight or buoyancy to a cavity in the mechanism. A smaller depressor would be required to maintain the required depth of the inclined conduit trailing end, whereas a horizontal array would require a larger depressor at the leading end of the horizontal section. Consequently, the equipment in a horizontal array configuration would increase the towing drag, would increase the towing line tension, and would complicate handling requirements.

As shown above, nozzles 36 can be spaced to increase the size of formed bubbles without significantly decreasing available compressed air pressure for a selected diameter of line 14. The ability to form larger bubbles and to adjust the bubble sizes provides superior attenuation capabilities. Preferably, the bubble screen is created so that the center of the screen is not more highly aerated than the screen sides. Bubble sizes up to three inches in diameter have been observed, although the largest bubbles tend to become mushroom shaped as such bubbles rise to the surface of water 12.

In one embodiment of the invention, a rectangular vertical window seven meters in depth and sixty meters in length was towed at a velocity of 4.5 to 5.5 knots. An air injection rate of 0.8 cubic meters of relatively low pressure air per linear meter of bubble curtain achieved the desired attenuation of the sound source from the air gun array. The differential pressure between the absolute air pressure in the submerged array and the hydrostatic head was approximately 40 psi. Air nozzles were 3/64 inch in diameter, on four inch centers, in a pair of thirty foot long sections of two inch diameter pipe. Attenuation in the band between 40 and 100 hertz was over 20 decibels for a bubble screen having a single 750 cubic inch array. Different nozzle sizes did not appreciably change the frequency response, although attenuation was proportional to total air volume.

To test a particular system, a low frequency generator and crystal can be used to drive a series of sine waves through the bubble screen to determine the resonant frequency of a bubble curtain at various depths. A dual channel spectrum analyzer and plotter can confirm the test results, and a series of files can be recorded to determine background noise from various sources. Noise files can be recorded to capture the bubble screen at various pressures and hole sizes, and the screen width and bubble size can be measured to assess these parameters. The volume of compressed air discharged can be evaluated to estimate the theoretical percentage of air in a water column. Compressed air pressures may range from 15 psi to overcome the head pressure of the outlets, to a maximum equipment rating of 200 psi. Observer logs can be maintained to record time, water temperature, compressed air pressures, water pressures, and wind or background noise sources. Charts showing air bubble resonance (hertz) versus depth for different sizes of bubbles can be configured to assess the attenuation capabilities of a particular system.

The invention provides an apparatus and method for attenuating undesirable seismic source signals from air guns towed behind a marine seismic vessel. At least one conduit or hose is towed behind the vessel to release bubbles into the water, and multiple conduits or lines can be oriented in an array. The size and distribution of the bubbles is controlled by varying the aperture size, the compressed air pressure, the aperture position and orientation on the conduit, and the vessel speed. The bubbles tune the acoustic energy source signals by attenuating directional frequencies to modify the seismic source signals. The resulting seismic source signals are increased in relative signal strength, undesirable noise is attenuated, and the signal form is modified to increase signal efficiency.

In a preferred embodiment of the invention, the bubble screen attenuates horizontal noise propagation of gun acoustic energy by establishing a vertical window of air bubbles on either side of the air gun array to attenuate incident acoustic energy through absorption and scattering. This reduces the amount of undesirable side emission from the sonar system and is particularly useful in shallow water applications. The air bubble screen is capable of providing different levels of selected source attenuation depending on bubble size and bubble zone orientation.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for attenuating signals generated by a seismic source towed in water behind a vessel, comprising:

a compressed air source;

a conduit for trailing behind the vessel as the vessel moves in the water, wherein said conduit has an end attached to said compressed air source for conveying compressed air and has a following end trailing behind the vessel; and a plurality of apertures in said conduit for distributing compressed air bubbles into a water zone proximate to the seismic source, wherein said apertures are selected to distribute air bubbles in said water zone to attenuate a selected range of the seismic source signals, and wherein an aperture size in said conduit trailing end is larger than an aperture size in the conduit end near the vessel.

2. An apparatus for attenuating signals generated by a seismic source vessel towed in water behind a vessel, comprising:

a compressed air source;

a conduit for trailing behind the vessel as the vessel moves in the water, wherein said conduit is attached to said compressed air source for conveying compressed air; and a plurality of apertures in said conduit for distributing compressed air bubbles into a water zone proximate to the seismic source, wherein said apertures are selected to distribute air bubbles in said water zone to attenuate a selected range of the seismic source signals, and wherein said apertures are positioned in a helical orientation about said conduit.

3. An apparatus for attenuating signals generated by a seismic source towed in water behind a vessel, comprising:

a compressed air source a conduit for trailing behind the vessel as the vessel moves in the water, wherein said conduit has a longitudinal axis and is attached to said compressed air source for conveying compressed air; and a plurality of apertures in said conduit for distributing compressed air bubbles into a water zone proximate to the seismic source, wherein said apertures are selected to distribute air bubbles in said water zone to attenuate a selected range of the seismic source signals, and wherein said apertures comprise downstream pointing nozzles having a discharge angle relative to the longitudinal axis of said conduit.

4. An apparatus as recited in claim 3, wherein said apertures are configured to release bubbles into a water zone above the seismic source.

5. An apparatus as recited in claim 3, wherein said apertures are configured to release bubbles into a water zone at substantially the same elevation as the seismic source.

6. An apparatus as recited in claim 3, wherein at least one aperture has a discharge angle parallel to the longitudinal axis of said conduit.

7. An apparatus as recited in claim 3, wherein at least one aperture has a discharge angle less than ninety degrees from the longitudinal axis of said conduit.

8. An apparatus as recited in claim 3, wherein said conduit has an end attached to the vessel and has a following end trailing behind the vessel, and wherein the aperture size in said conduit near the conduit trailing end is larger than the aperture size in the conduit end near the vessel.

9. An apparatus as recited in claim 3, wherein said apertures are positioned in a helical orientation about said conduit.

10. An apparatus as recited in claim 3, wherein said apertures are positioned to resist coalescence between bubbles formed by other apertures.

11. A method for attenuating signals generated by a seismic source towed in water behind a moving vessel, comprising the steps of:

deploying a conduit to trail behind the vessel in a selected orientation relative to the seismic source, wherein said conduit has a hollow interior formed by a conduit wall for conveying compressed air, said conduit has a plurality of apertures in said conduit wall, and at least one of said apertures has an outlet dimension equal to or greater than 9.0 millimeters;

selecting a vessel speed and forming the aperture size and orientation based on the selected vessel speed;

supplying compressed air to said conduit to pressurize said conduit interior; and releasing the compressed air from said conduit interior through said apertures to form bubbles in a water zone proximate to the seismic source for modifying said water zone to attenuate a selected range of the seismic source signals.

12. A method for attenuating signals generated by a seismic source towed in water behind a moving vessel, further comprising the step of:

deploying a conduit to trail behind the vessel in a selected orientation relative to the seismic source, wherein said conduit has a hollow interior formed by a conduit wall for conveying compressed air;

supplying compressed air to said conduit to pressurize said conduit interior;

placing a plurality of apertures in a helical orientation around said conduit; and releasing the compressed air from said conduit interior through said apertures to form bubbles in a water zone proximate to the seismic source for modifying said water zone to attenuate a selected range of the seismic source signals.

* * * * *